United States Patent [19]

Moreau et al.

[11] Patent Number: 5,000,119
[45] Date of Patent: Mar. 19, 1991

[54] WEDGE-SHAPED MILKING STALL AND PARLOR

[75] Inventors: Joseph R. Moreau, New Hartford; Albert Anderson, Amsterdam, both of N.Y.

[73] Assignee: Norbco Inc., Westmoreland, N.Y.

[21] Appl. No.: 572,895

[22] Filed: Aug. 27, 1990

[51] Int. Cl.$^5$ .............................................. A01K 1/12
[52] U.S. Cl. .................................... 119/14.03; 119/27
[58] Field of Search ...................... 119/14.03, 14.04, 27

[56] References Cited

U.S. PATENT DOCUMENTS

| | | | |
|---|---|---|---|
| 1,987,955 | 1/1935 | Hapgood | 119/14.04 |
| 3,246,631 | 4/1966 | Holm | 119/14.03 |
| 3,261,324 | 7/1966 | Conover | 119/14.03 |
| 3,805,742 | 4/1974 | Shulick et al. | 119/14.03 |
| 4,207,837 | 6/1930 | Schwartau et al. | 119/14.03 |
| 4,513,687 | 4/1985 | DeJong . | |
| 4,854,268 | 8/1989 | Kipiz | 119/14.03 |

FOREIGN PATENT DOCUMENTS

| | | | |
|---|---|---|---|
| 191662 | 9/1957 | Austria | 119/14.03 |
| 1447327 | 12/1988 | U.S.S.R. | 119/27 |

OTHER PUBLICATIONS

Segeren Made; Nieuw Type Melkstal de Hudonk Zij-aan-zij Melkstal.
Armstrong et al., Parallel Milking Parlor Performance & Design Considerations, ASAE Meeting Presentation, Jun. 1990.
Westfalia Side-by-Side ParPors-Advertisement in Country Folks, Apr. 16, 1990.
The Right Angle Parlor Could be the Right Answer for Your Future!, Advertisement, The Dairyman, Jan. 1990.
Goosen Parallel Stalls: For Faster Easier Milking. Goosen Industries, Aug. 1989.
Americas Nu-Kumfort Parlor Stalls, Americas International Dairy Equipment Co., Date Unknown.
Kipe Side by Side Milking Parlor, Date Unknown.
Milking Systems and Milking Management, Proceedings from the Milking Systems and Milking Management Symposium, Jan. 13-14, 1988.
Armstrong et al., Parallel Milking Parlor Performance and Design, ASAE Meeting Presentation, Feb. 17, 1989.

Primary Examiner—Paul J. Hirsch
Attorney, Agent, or Firm—Wall and Roehrig

[57] ABSTRACT

A cow stall for a side-by-side type milking parlor, i.e., of the type in which the cow is milked from behind her hind legs, has its side walls angled outward to be somewhat wedge shaped. In the milking parlor, the operator pit can be of arcuate shape, so that the operator can see all of the stalls from any vantage point in the pit. Because the stalls angle out, the stall width is at least about thirty-one inches at the front gate to accommodate the cow comfortably, and it is reduced to about twenty-two inches at the rear wall. i.e. at the operators pit. This reduces the distance from one operator position to the next without impairing the exit of the cow through the front gate following milking.

13 Claims, 10 Drawing Sheets

WEDGE-SHAPED MILKING STALL AND PARLOR

BACKGROUND OF THE INVENTION

This invention relates in general to the field of cattle stalls, in particular, in milking parlors and milking stalls having a unique wedge shape for compact parlor design, efficient parlor operation and maximum comfort for the cow.

A milking parlor generally consists of an array of individual stalls, each designed to hold a cow or other dairy animal while she is being milked. An attendant or operator is usually required to be present at the parlor to perform such tasks as ensuring that the animals are properly situated in the stalls; washing the udders prior to milking; applying milker units; and monitoring and attending to the operation of the milker units.

Figure 1:
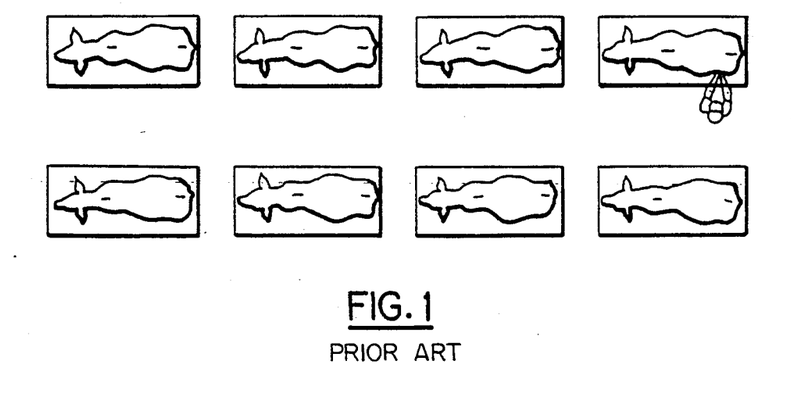
FIG. 1 is a schematic plan view of an end-to-end milking parlor of the prior art.

In early prior-art serial milking parlors, cows were placed in rectangular shaped stalls arranged in an end-to-end configuration, as shown in FIG. 1. In such parlors, the milking operation was performed alongside the cow. The operator had to walk the entire length of the cow in order to go from one cow to the next in attending to the milker units. Even for moderately sized milking parlors the required walking by the operator became excessive and physically tasking.

With the traditional serial configuration, the operator could not visually inspect the operation of all the milking units from one location because of the linear arrangement of the cow stalls and the distance separating the milker units. Consequently, the operator could not adequately meet problems arising at any given stall during milking.

Figure 2:
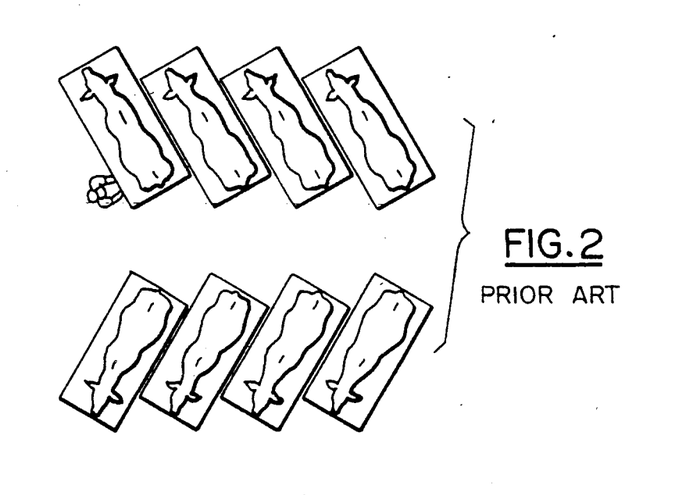
FIG. 2 is a schematic plan view of a herringbone milking parlor of the prior art.

An improvement to the serial configuration was made by arranging the stalls in the so-called herringbone configuration, as shown in FIG. 2. Like the serial configuration, the milking operation for the herringbone parlor is performed alongside the cows. The stall-to-stall distance the operator must walk to reach the next milker unit was reduced somewhat compared to the end-to-end configuration. However, the herringbone parlor still requires the operator to walk a considerable distance to each stall. In addition, the design was far from optimum for visual inspection of the milker units during the milking operation.

Figure 3:
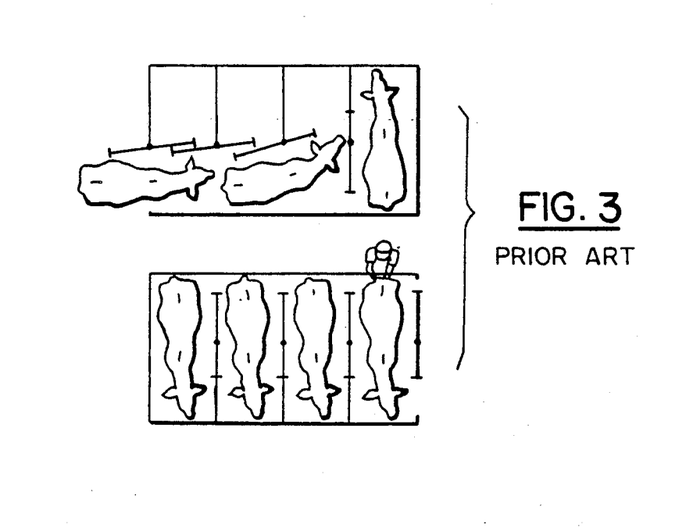
FIG. 3 is a schematic plan view of a right-angle or parallel milking parlor of the prior art.

A recent development in parlor design has yielded the side-by-side or parallel stall configuration, sometimes called right-angle stall configuration, as shown in FIG. 3. In this design, milking takes place at the rear of the cow, between the hind legs. The distance of travel for the operator has also been reduced as compared to the herringbone and end-to-end or serial parlor configurations. The distance from one milking unit to an adjacent unit is essentially reduced to the minimum width dimension of the stall. Normally, a cow requires a stall width of at least twenty-eight to twenty-nine inches (twenty-six inches, post to post) for milking to avoid discomfort or injury. Thus, the parallel parlor configuration is an improvement over the end-to-end and herringbone designs. However, the distance from one milker unit to the next cannot be reduced to less than the acceptable minimum width of a rectangular milking stall. The linear arrangement of this parlor configuration is also less than suitable for visual inspection of the milker units during the milking operation.

Figure 4:
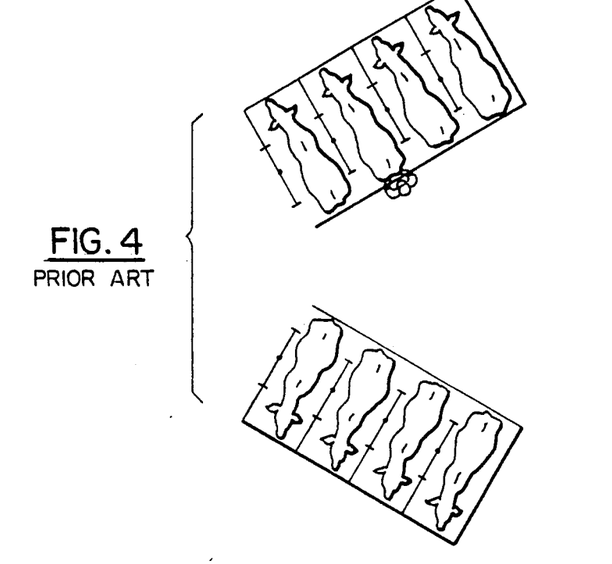
FIG. 4 is a schematic plan view of an alternative parallel milking parlor of the prior art.

An attempt to improve upon this visual inspection capability of the parallel stall involves arranging the parallel parlors in a V-shape, as shown in FIG. 4. However, it has been found that the V-shaped arrangement has not significantly improved the operator's ability to visually inspect and respond to any given milker unit during the milking operation.

Some parallel stall parlors are designed so that the cows enter along a rear pathway and turn a sharp angle, e.g. 90 degrees, into the individual stalls, as shown in FIG. 3. The sharp turn can be difficult for many cows to negotiate, and sometimes results in cow traffic jams in the parlor and discomfort or injury to cows, and may require operator intervention.

Figure 5:
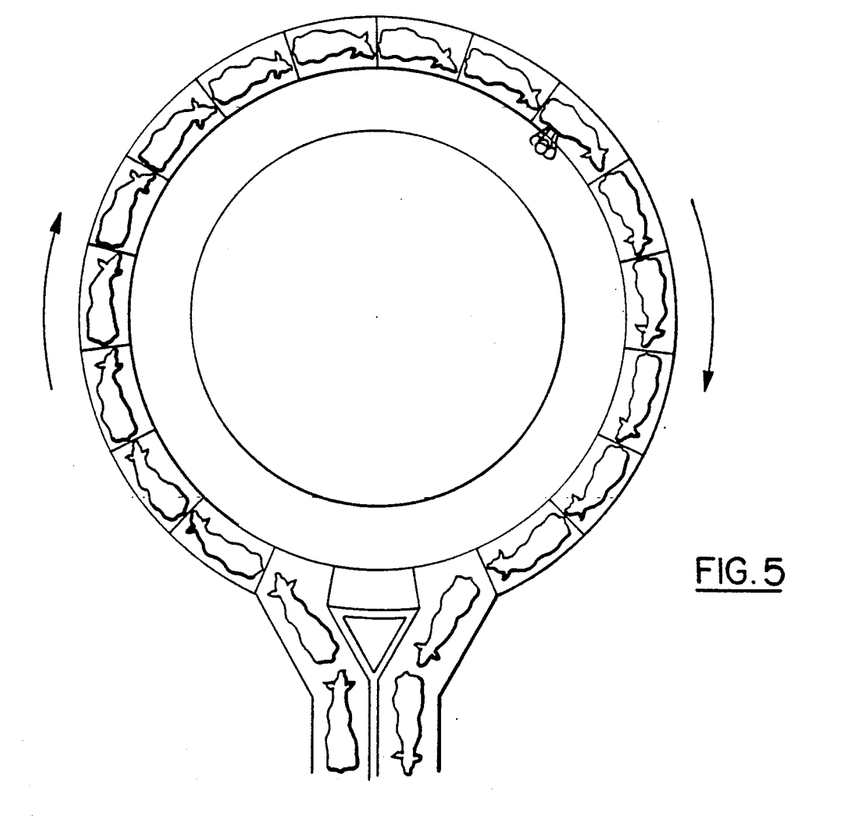
FIG. 5 is a schematic plan view of a rotary milking parlor of the prior art.

A tandem rotary parlor design utilizes end-to-end stalls arranged in a circle, as shown in FIG. 5. The parlor is rotatable about a central operator area. The operator can, in principle, basically stand at a single position and attend to each stall in the parlor as the cows revolve past. Such a rotary parlor is an elaborate mechanical system with high operating costs and requires a substantial commitment to maintenance. Another disadvantage is that the cows enter the parlor one cow at a time, which limits the number of cows that can be milked in a given period of time.

Figure 6:
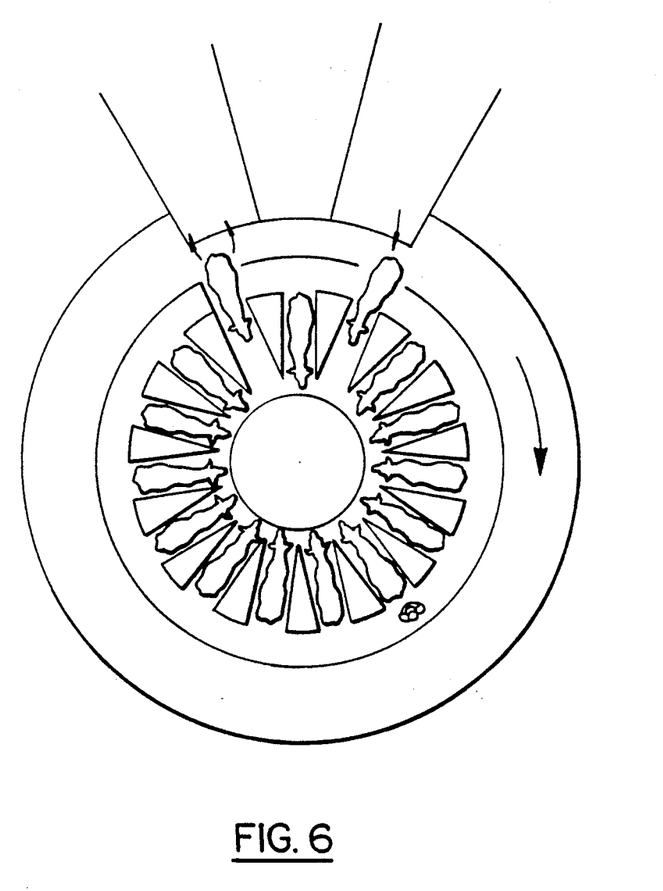
FIG. 6 is a plan view of another rotary milking parlor of the prior art.

Still another parlor design available utilizes parallel stalls disposed in a circular configuration where the cows enter the stalls from a ramp at the perimeter of the parlor, as shown in FIG. 6. This parlor is also designed to rotate about its center. As with the rotary parlor of FIG. 5, with this parlor the cows enter one at a time. After milking, the cows must back out of the stalls onto the ramp to exit the parlor. Backing out is usually a slow process, and often requires operator intervention. As shown, the operator is situated outside the perimeter of the parlor. In some instances, he may be required to walk the perimeter of the parlor. Also, in this configuration the operator cannot inspect all of the milker units without having to either rotate the parlor at a relatively high rate or walk the entire perimeter of the parlor.

OBJECTS AND SUMMARY OF THE INVENTION

It is accordingly an object of the present invention to provide apparatus that overcomes the problems associated with the prior art.

Another object of the present invention is to provide a milking parlor that is compact in design, efficient in operation, and comfortable and safe for the cows.

A further object of the present invention is to provide a milking parlor that has a substantially reduced operator-travel distance from one stall of the parlor to another.

Still another object of the present invention is to provide milking parlor that enables the operator to immediately visually inspect all the stalls of the parlor and the equipment being employed at the stalls.

A yet further object of this invention is to provide a milking parlor that achieves greater throughput, a larger number of cows milked per hour, and which enhances operator performance.

Yet another object of the present invention is to provide a milking parlor that has substantially reduced travel distance for the cows upon entry into the parlor and into the respective individual stalls.

Yet another object of the present invention is to provide a milking parlor that enables efficient sequential loading of animals into the parlor and quick simultaneous exiting out of the parlor.

Still another object of the present invention is to provide a dairy or milking stall that is configured to be arranged with other stalls of the same or similar configuration to construct a parlor achieving all of the above-cited objects.

An additional object of the present invention is to provide a milking stall that facilitates entry of a dairy animal into the stall.

Still another object of the present invention is to provide a new stall configured with a greater width at the front of the stall for facilitating a quick forward exit, while at the same time being configured with a minimum width at the rear of the stall for containing the hind end the animal during milking and for reducing the effective distance over which the operator must travel from one milking position to the next.

These and other objects are attained in accordance with the present invention wherein there is provided a milking cow stall for a milking parlor where the cows or other dairy animals are positioned side by side for milking from behind their hind legs. The stall is generally wedged outward from back to front with a pair of side wall members, an exit gate at the front of the stall, a rear wall member that defines a milker operator position, and a pneumatic opener for opening and closing the front exit gate of the stall. The walls include a cow-operated entrance swing gate that is in one position when the stall is unoccupied to define a passageway for cows through the stall, the passageway extending from the rear wall member to the swing gate. In this position, the gate extends across the stall so that a cow will proceed to the next unoccupied stall in sequence. When the cow enters the stall, she swings the gate to another position to open the next adjacent stall and block off the cow passageway, so that the next cow in sequence will proceed to the adjacent stall. The cows are positioned in the stalls with their hind legs against the rear wall member, which can comprise a kick rail manure trough. The two side wall members are angled outward from each other so that the stall is wider at the front and narrower towards the rear wall. The stall can have a width of about thirty-one inches (80 cm) or more at the front gate to facilitate quick exiting and reduced to about twenty-two inches (55 cm) or less at the rear. This reduces the station-to-station distance that the operator must walk between cows without impairing the exiting of the cows through the front gate following a milking operation.

Because of the wedge shape, the milking parlor can be arranged around either a circular or an eye-shaped operator area, with the row of milking stalls arcing around the operator area. This further reduces the distance between operator stations, and moreover, permits the operator to visibly inspect the cows and milker units from anywhere in the operator area.

The exit gates can preferably be race type gates, i.e., with left and right doors that swing forward to release the cows and swing across towards each other to close for the next cow to be milked. The position of the left and right doors can be selected to adjust the distance from the closed exit gate to the rear wall member. The stalls can include an indexing feature, in which the operator adjusts the gate for the length of the individual cow so that the cow's hind legs are substantially against a kick bar or manure trough across the rear wall of the stall. A reinforced edge of the manure trough can eliminate the need for a separate kick rail.

The improved milking stall and the improved milking parlor based on that stall improve operator effectiveness and reduce operator fatigue in a milking operation. The operator has a clear view of the cows and milkers at all positions in the operator area, and can attend to any problem as soon as it arises.

While the milking parlor is described in reference to dairy cows, it should be noted that the same principles can be applied to milking parlors for goats or other dairy animals.

Also, instead of the race-track gate release system, the stalls can be arranged to swing or lift upward above the cows, so the cows are free to exit to the return lanes for rapid exit. In such a system, the stalls would need to be wedge shaped only from the hind end to the stomach of the cow, but could be, e.g. of diamond shape overall.

The above and many other objects, features, and advantages of this invention can be appreciated from the following description of a preferred embodiment, to be read in connection with the accompanying Drawing.

DETAILED DESCRIPTION OF THE PREFERRED EMBODIMENTS

Figure 7:
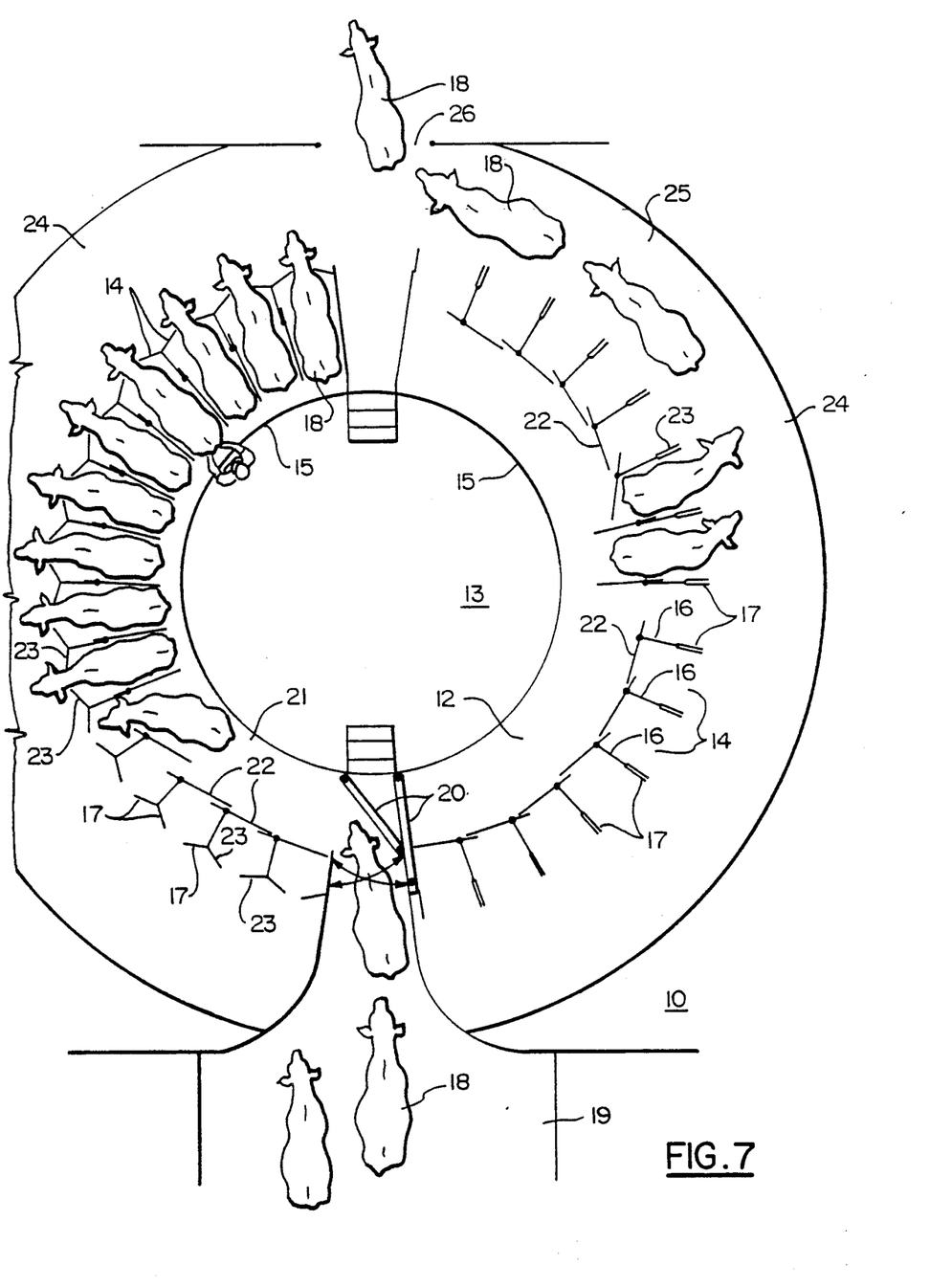
FIG. 7 is a schematic plan view of a milking parlor according to one embodiment of the present invention.

Turning now to FIG. 7 of the drawing, a milking parlor 10 according to one embodiment of this invention is shown in overhead plan view. There is a circular platform or cow stand 12 arranged around a circular milker operator pit, which has a floor recessed about thirty-two to forty inches below the cow stand. Arranged around the inner rim of the cow stand 12 is a circular row of milking stalls 14, which have their rear walls 15 disposed at the rim of the operator pit 13. The stalls 14 are defined between successive side walls 16 which have race-type exit gates 17 at the front, or radially outward side of the stalls. In this arrangement, dairy cows 18 enter from a holding pen 19 and through an entrance gate 20 into an entry lane 21. The lane 21 is a passageway that extends through the stalls 14 between the rear wall 15 and a succession of cow-operated swing-type entry gates 22. These gates 22 are each part of the side wall 16 of one of the stalls 14. When the stall 14 is unoccupied, the gate 22 swings to the position, shown at bottom left in FIG. 7, to close off the stall so that a cow 18 entering the parlor will proceed all the way to the last unoccupied stall. When the cow 18 enters the stall 14, she pushes the swing gate to its other position, and this opens the adjacent stall 14 for the next successive cow. The front exit gates 17 in this embodiment are formed of a pair of swing doors 23, each of which closes against a respective shoulder of the cow 18. At the end of a milking operation, the operator can open the doors 17, as shown on the right hand side of FIG. 7, and the cows can exit rapidly to a return platform 24 then walk to a return lane 25 and from there proceed out of the milking parlor through a parlor exit 26. When the cows exit the stalls 14, the swing gates 22 rotate to their position to close off the stall and open the entry lane 21. This arrangement takes advantage of the fact that the cows 18 are somewhat broader at the flank than at the hip. The stalls 14 are wedged, that is, narrower at the back wall 15 than at the exit gate 17. At the exit gate end or front of the stall 14, the side walls 16 are separated by thirty-one inches (i.e., 80 cm) or more, to facilitate quick exiting and accommodate the cow comfortably. However, at the rear of the stall, i.e. at the rear wall 15, the stall width it reduced to about twenty-two inches (i.e. 55 cm). This means that the distance that the operator must move from one cow to the next is reduced considerably, i.e. from thirty-one inches or more down to twenty-two inches thereby reducing milker operator fatigue, and increasing milker sufficiency and performance. Also, with this circular pit arrangement, the operator can see all of the cows 18 and all the associated milkers units from any vantage point within the pit 13. The most distant cow in the milking parlor stalls 14 is no farther away from the operator than the diameter of the pit 13. With the race-type exit gates 17, gentle pressure can be applied to the doors 23 to position or index the cows 18 so that each cow has its hind legs positioned against the back wall 15.

Figure 8:
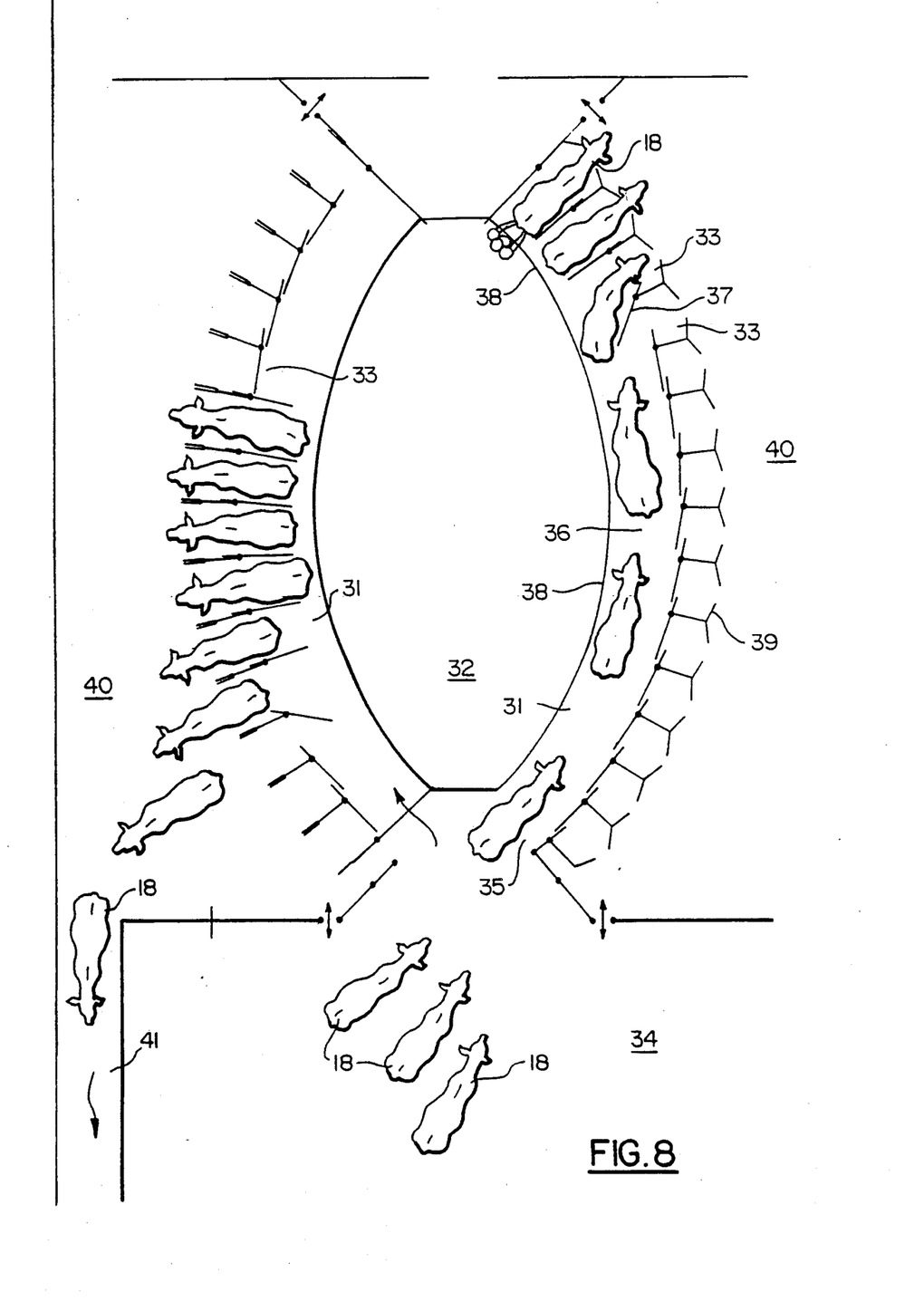
FIG. 8 is a schematic plan view of a milking parlor according to another embodiment of the present invention.

Another milking parlor according to an embodiment of this invention is shown in FIG. 8, and this parlor is similar to that of FIG. 7, but has opposite arcuate sides so that it is generally the profile of a football or an eye. In this embodiment, there are arcuate cow stands 31 o either side of the football-shaped operator pit 32. Each cow stand 31 has a respective row of milking stalls 33 and these stalls 33 are generally of the same configuration as in FIG. 7. Here, the cows 18 proceed from a holding pen 34 through a gate 35 into an entry lane 36 for one of the cow stands. The cows 18 proceed to the farthest unoccupied stall 33 where the cow entering the stall 33 pushes a cow operated gate 37 to open the next successive stall 33 for the next cow 18. When in the stalls 33, the cows 18 are positioned with their hind legs against the back wall 38, and their heads through an exit gate 39. The exit gates 39 are opened after a milking operation to release the cows, which proceed onto a return platform 40 on the associated side of the parlor. From the return platform 40 the cows proceed to a return lane 41 to exit the milking parlor. Although only one lane is shown here, there are favorably two return lanes 41, one for each side of the parlor. As with the previous embodiment, the cows are oriented with a minimum distance for the operator to travel from one cow 18 to the next for preparing the cow for milking, installing the milker unit, and removing the milker units when milking is complete. The operator can see each cow stall from all vantage points within the pit 32.

Figure 9:
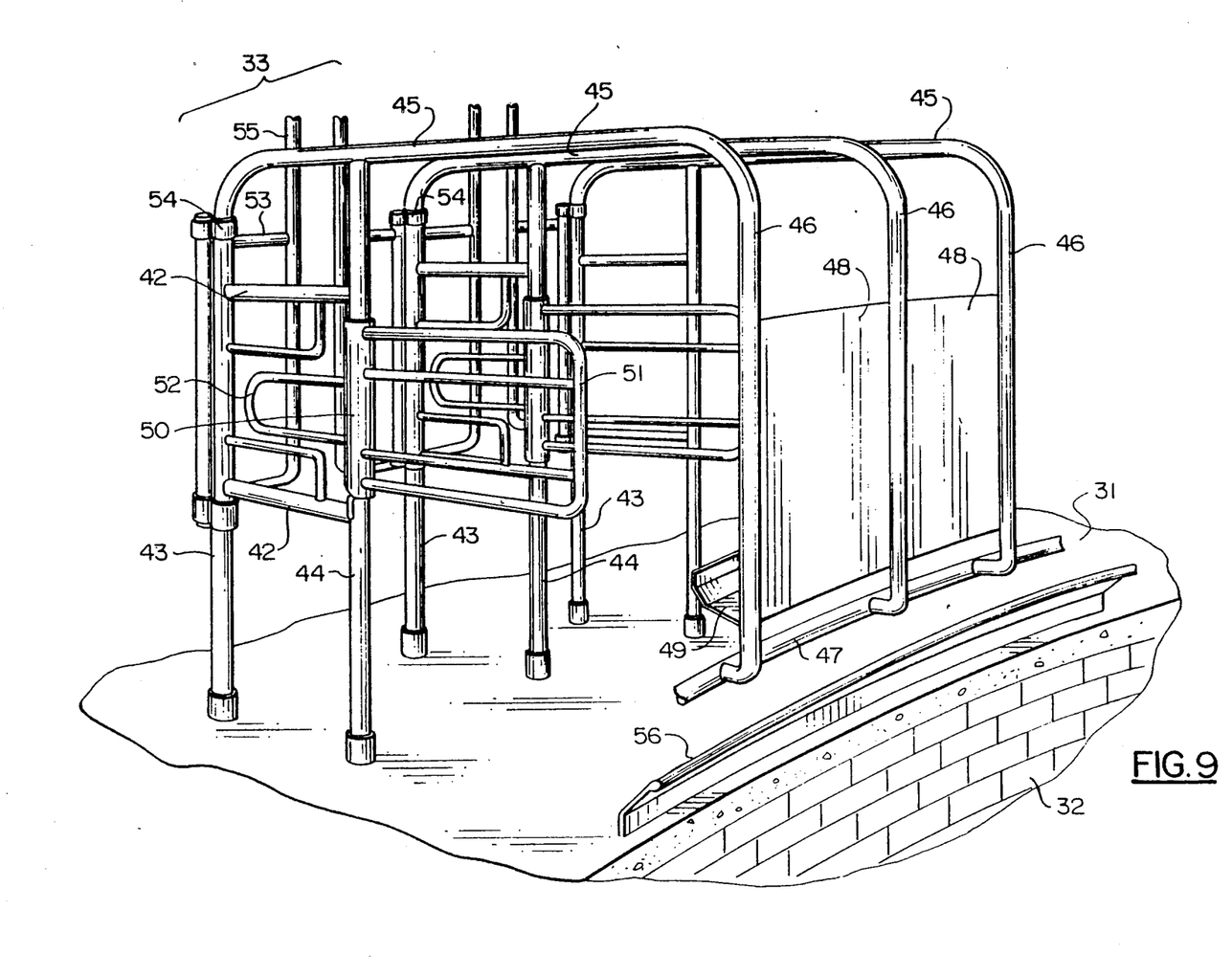
FIG. 9 is a partial perspective view of a portion of the milking parlor of either FIG. 8 or FIG. 9.
Figure 10:
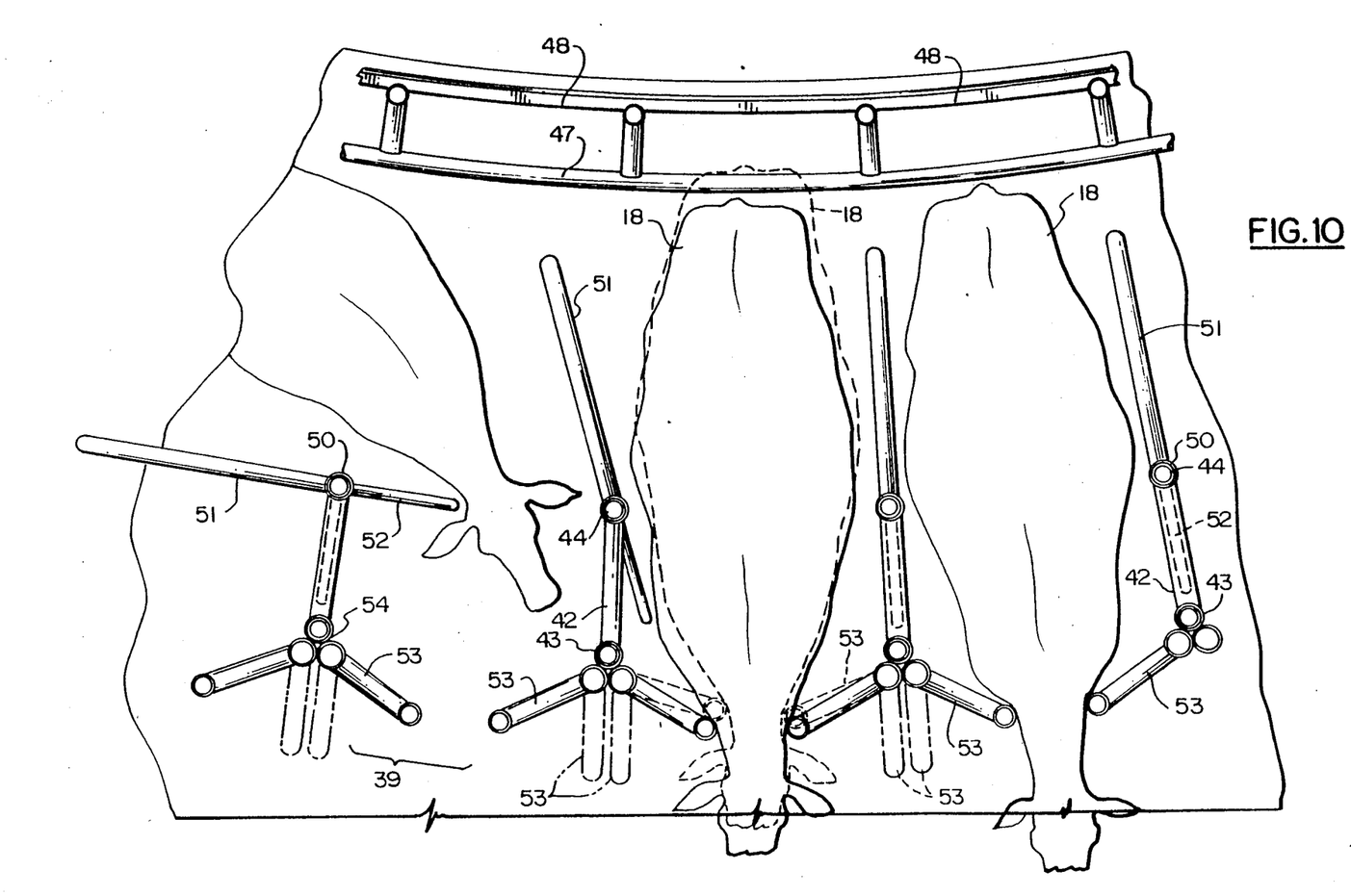
FIG. 10 is a top plan view of the portion of the milking parlor shown in FIG. 9.
Figure 11:
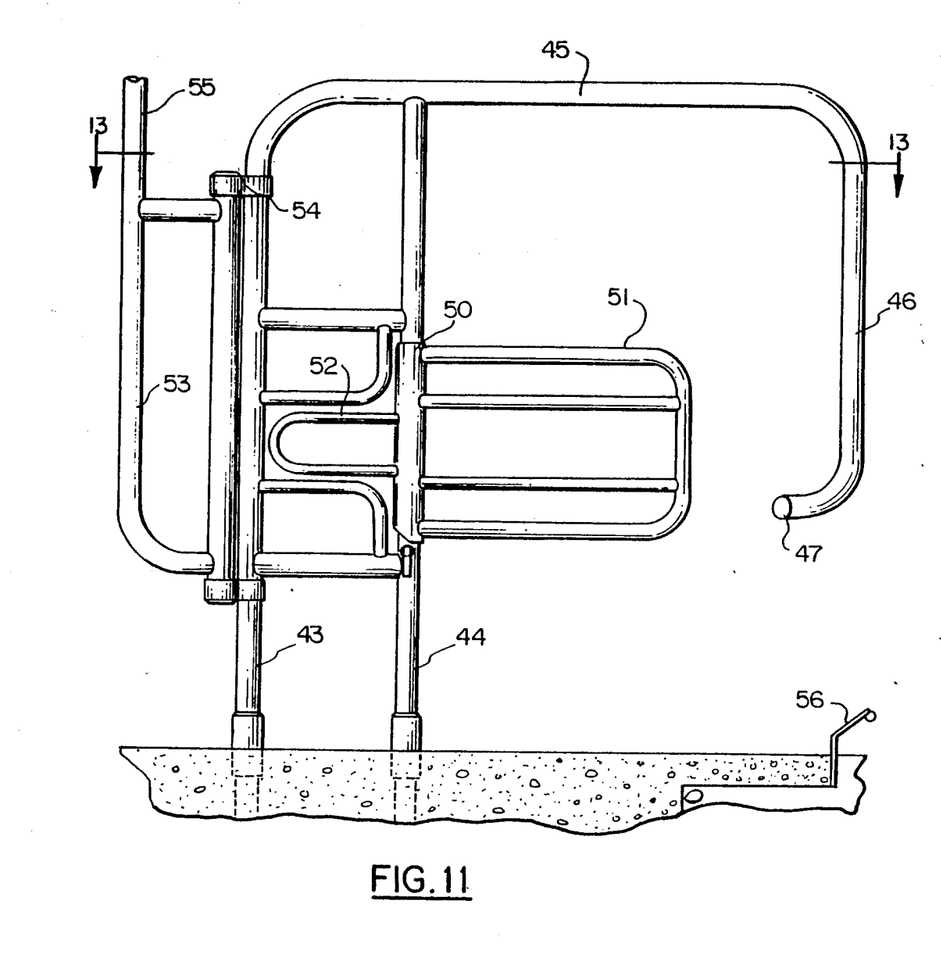
FIG. 11 is a side elevation and FIG. 12 is a front elevation of a milking stall of the type shown in FIG. 9.

As shown in greater detail in FIGS. 9-12, the milking stalls 33 are arranged on the cow stand or platform 41 radiating outward from the rim of the operator pit 32. Each of the stalls 33 is defined between successive side walls 42. As shown in FIGS. 9 and 11, the side wall 42 has a front post 43 and a rear post 44 which are planted in the floor of the cow stand 31. These posts extend to an upper or overhead tube 45 that reaches back to a down tube 46. The down tube defines the rear wall 38 of the stall. The lower end of the tube 46 supports a transverse kick bar or rail 47 that is positioned a predetermined distance above the cow stand floor i.e., twenty-eight inches, or part-way up the hind leg of the cow 18. The kick bar is provided to prevent the cow from kicking back towards the operator. As shown, e.g. in FIG. 9, a spray shield panel 48 is supported between the down tubes 46, and a manure trough 49 runs along the rear wall 38 at the base of the spray shields 48. The shields 48 prevent any cow defecation from entering the operators pit and soiling the milk handling equipment. The presence of the shields 48 will also make it difficult for the cow 18 to raise her tail so that defecation is usually delayed until after the cow has exited the stall 33.

As shown in FIGS. 9, 10, and 11, the swing gate arrangement 36 has a pivot tube 50 that is mounted over the rear post 44, a main gate 51 that extends outward from the pivot tube 50, and a tongue 52 that extends in the opposite direction from the tube 50. As shown in FIG. 10, when a cow 18 enters a stall she will nudge against the tongue 52, thereby swinging open the next stall by orienting the main gate 51 towards the rear wall 38.

Figure 12:
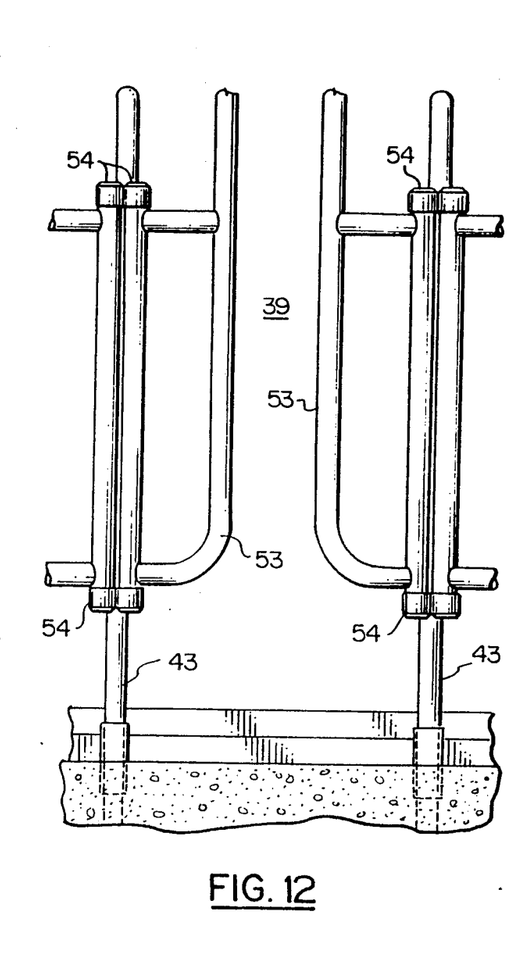

The exit gate 39, as shown in FIG. 12, has a pair of doors 53, each of tubular construction, which swing from hinge members 54 mounted on the front posts 33 to the left and right of the stall. The gates close to a distance of about ten to twelve inches to the position shown in full line in FIG. 10, but open fully to beyond thirty-one inches, as shown in chain line. The two doors 53 begin part way up the front posts 43. A cow entering the stall 33 can place her head directly in the space between the doors, or by bowing or stooping slightly, place her head between the two doors 53, so that each door is against one of her shoulders. An arm 55 protrudes upward above the stall, and this arm is used for actuation of the exit gate, as described below. A floor shield 56 is also provided at the rim of the pit 32, to prevent any defecation, dirt, or any other foreign matter from entering the milking pit.

Figure 13:
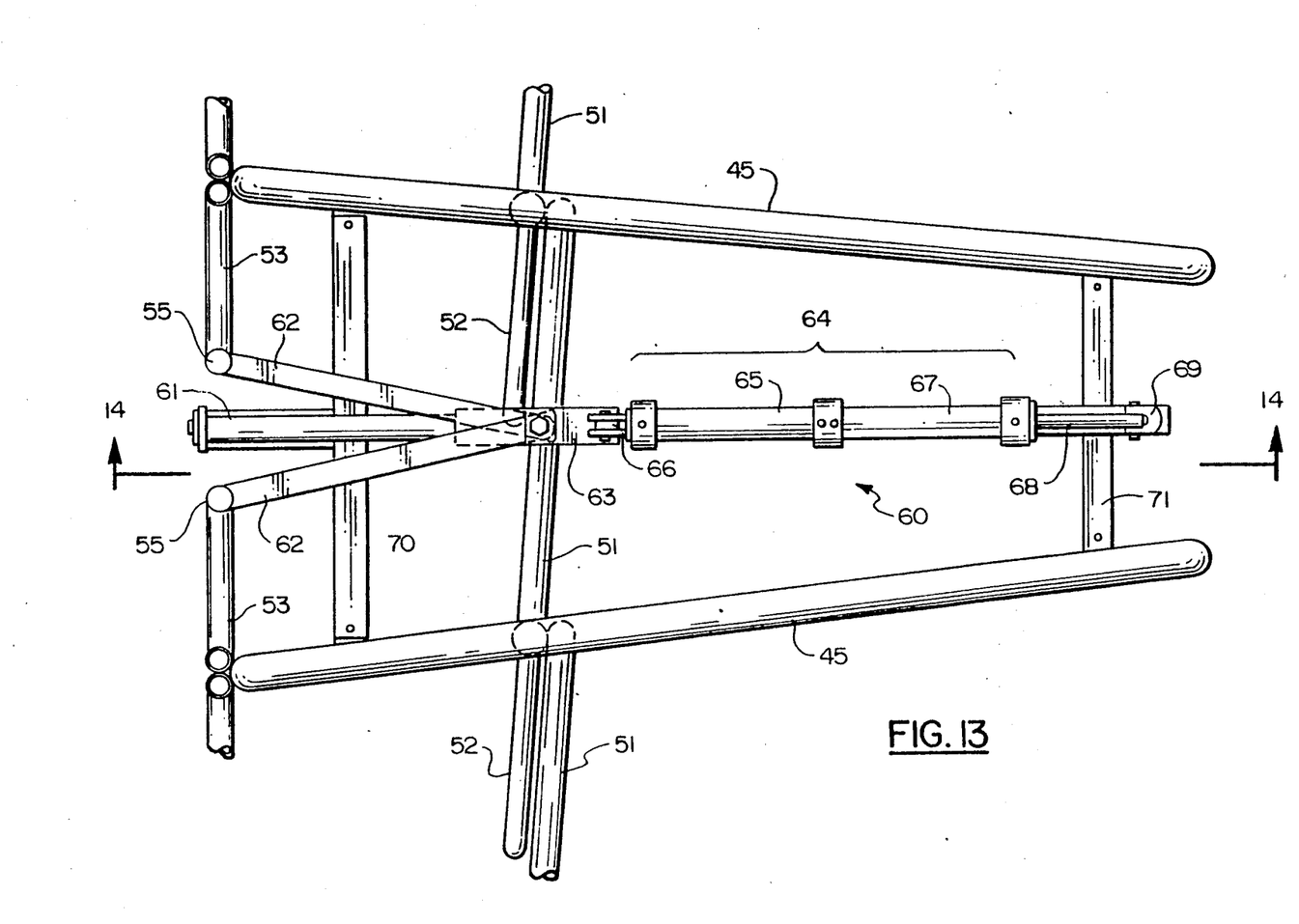
FIGS. 13 and 14 are top plan and side elevation views respectively of the pneumatic actuator for opening and closing the stall exit gates and for indexing the cows.
Figure 14:
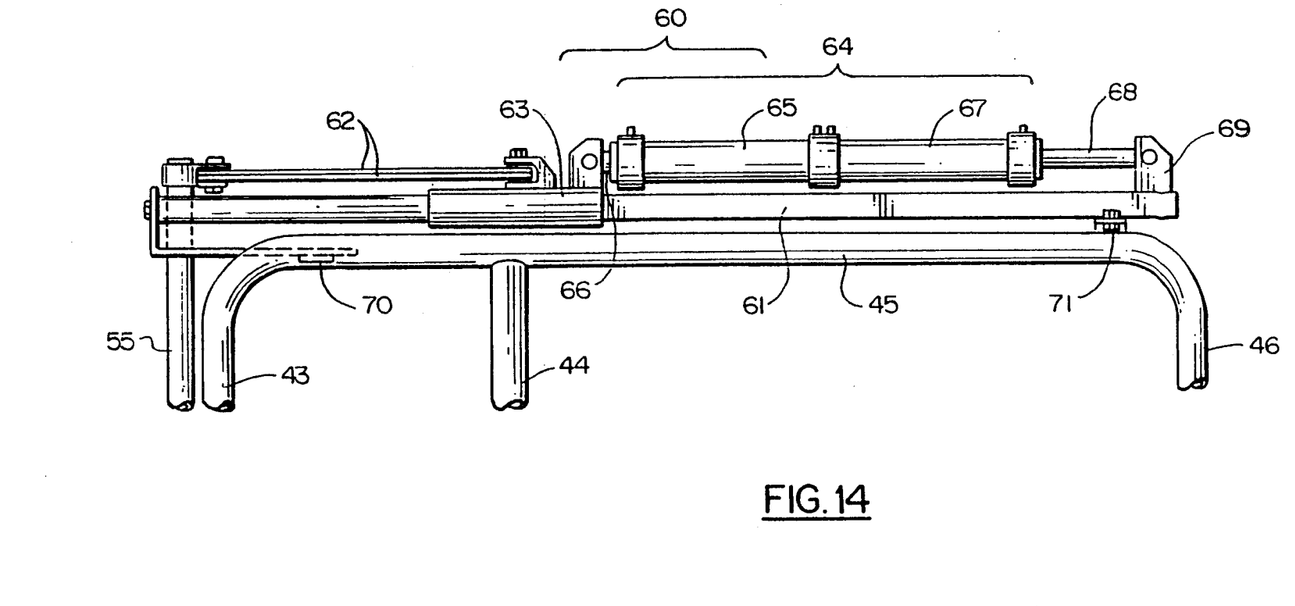

As shown in FIGS. 13 and 14, an exit gate actuator assembly 60 is positioned overhead above each of the stalls 33. The assembly 60 has a rail 61 that is mounted onto the overhead tubes 45. Linkages or pitmans 62 connect the ends of each of the door arms 55 to a slide 63 that travels along the rail 61. A tandem pneumatic cylinder assembly 64 has a first cylinder 65 with a piston rod 66 connected to the slide 63 and a second cylinder 67 whose piston rod 68 is connected to a projection 69 at the rear end of the rail 61. The first cylinder 65 is actuated to open or close the gates 39 and the second cylinder 67 is employed for indexing or positioning the cows individually so that their hind legs are properly positioned against the kick rail 47. Also shown in FIGS. 13 and 14 are support struts 70 and 71 which mount the rail 61 to the overhead tubes 45 at the front and rear respectively.

Returning now to FIG. 10, the indexing or positioning cylinder 67 is employed to adjust the distance from the kick rail 47 to the exit gate doors 53 to accommodate the individual cow. The dairy cows 18 are not all of the same length, and may or may not enter the milking parlor in any particular order. Also, the kick rail 47, spray shield 48, and manure trough 49 will be in position to function properly only if the cow is properly positioned with her hind legs against the kick rail 47. To achieve this, gentle pressure is applied by the cylinder 67 to urge the swing gate doors gently against the cow's neck. For a shorter cow, the doors 53 will close somewhat, as shown in dash lines in FIG. 10, until the cow 18 moves back against the kick bar, as shown in ghost. For a longer cow, the exit gate doors 53 can move forward somewhat.

With the milking stalls and milking parlors as described hereinabove, the entire milking parlor design can fit into a milking barn without crowding of cows. Operator fatigue is reduced because the distance between milking stations is minimized. This also increases milker efficiency and performance. If there is a problem with any of the cows or with any of the milker units, the operator will be made aware of this instantly, as the operator can see all of the milking stalls from any vantage point within the pit.

While not described specifically hereinabove, many modifications and embodiments are possible. For example, a feed manger could be included in front of the exit gates. The indexing or positioning of the cows in the stalls can be semi-automatic, that is initiated by the operator, or can be fully automatic. Also, while not shown, there are gutters for urine and defecation, e.g. in the return platform 40 and in the return lane 41. Furthermore, in other embodiments, the milking stalls 14 or 33 could be entirely suspended from overhead, so that no openings need be made in the cow stand for support.

This invention also comprehends milking parlors in which a forward part of the stall, or the entire stall, is lifted upwards to release the cow. In that event, only the rearward part of the stall, i.e., from the stomach to the hind end of the cow, needs to be wedge shaped.

While this invention has been described in detail with respect to certain preferred embodiments, it should be appreciated that the invention is not limited to those precise embodiments. Rather, many modifications and variations would present themselves to those of skill in the art without departing from the scope and spirit of this invention, as defined in the appended claims.

What is claimed is:

1. Milking stall for a milking parlor of the side-by-side type in which a dairy animal in the stall is milked from behind her hind legs, the milking stall comprising first and second side walls, front gate means disposed at a front of the stall to move out of the way of the animal after a milking operation, a rear wall member which defines an operators position, means to open said front gate means to release the animal at the end of a milking operation and to close the front gate means before admitting another animal into the stall for a subsequent milking operation, said walls each including an animal-operated swing gate which when in one position defines a passageway for animals through the stall at said rear wall member and which swings by an animal entering the stall to another position to block said passageway and open an adjacent stall to admit a successive animal thereto, such that the animal in the stall faces the front gate with her hind legs against the rear wall member; wherein said first and second wall are wedged outward to be wider forward of the rear wall member and narrower at the rear wall such that the stall width is of sufficient width at a distal position to accommodate the animal's stomach comfortably and is reduced substantially to a width corresponding to the hind end of the animal at said rear wall member to reduce the distance from one operator position to the next without impairing the exit of the animal following milking.

2. Milking stall according to claim 1 wherein said front gate means includes a race-type gate having left and right doors which are hingedly attached to distal ends of said first and second side walls, respectively, and are swingable between an open position in which said gates are swung forward to permit the animal to exit, and a closed position in which the doors are held against the shoulders of the animal.

3. Milking stall according to claim 2 wherein said means to open and close the front gate includes indexing means to adjust the closed position of the doors of the front gate means to meet the shoulders of the animal when her hind legs are against the rear wall member, for a range of lengths of dairy animals.

4. Milking stall according to claim 1 wherein said means to open and close the front gate means includes a respective gate-operating air cylinder mounted above the position of the animal in the stall, linkage means coupling a piston of the air cylinder to said first and second gates to swing the same between its open and closed positions.

5. Milking stall according to claim 4 wherein said means to open and close includes an indexing air cylinder coupled to said linkage for adjusting the closed position of the front gate doors to be closer to said rear wall for a shorter animal and farther from the rear wall member for a longer animal.

6. Milking stall according to claim 5 wherein said means to open and close the front gate includes a rail extending from the rear to the front of the stall above the stall, a slide movable along said rail, said gate operating cylinder and said indexing cylinder having its position attached to a fixed member at the rearward end of the rail, and an actuating linkage coupled at one end to said gate-closing cylinder and at another end to said front gate means to swing same between open and closed positions thereof.

7. Milking stall according to claim 1 wherein said rear wall member includes transverse horizontal kick bar means which is positioned against the animal's hind legs for preventing her from kicking the operator, a manure shield across the rear wall member above the kick bar means to prevent the animal from defecating onto the operator position, and a manure trough across the stall at said rear wall member below the manure shield to catch any defecation when the animal is in the stall.

8. An improved milking parlor of the side-by-side type in which dairy cows are milked from a milker operator position behind their hind legs, the parlor comprising a milker operator area of arcuate plan, and row of successive milking stalls arranged side-by-side around the operator area and facing out therefrom, to accommodate a group of cows to be milked, each said milking stall including first and second side wall members, exit gate means disposed at a front end of the stall, a rear wall member at a rear end of the stall adjacent the operator area, means to open the front gate means of the stall to release the cow at the end of a milking operation and to close the front gate means before admitting a successive group of cows into the milking parlor for subsequent milking operation, the wall members each having a respective cow-operated swing gate which in one position closes off an adjacent stall to define a cow entry passageway between the swing gates and the rear wall member, and which swings to another position by action of a cow entering the stall to block the cow entry passageway and open said adjacent stall to admit therein the next successive cow in the group, with the cows facing out away from the operator area with their hind legs adjacent the rear wall member; wherein said stalls are wedge shaped at least from said rear wall member distal thereof to a position of the cow's stomach, with the first and second wall members being more widely separated towards the front gate means and closer towards said rear wall member such that the stall widths are at least of sufficient width at said position distal of the rear member to accommodate the cow comfortably and are reduced substantially to a width corresponding to the hind ends of the cows at said rear wall member to reduce the distance from one operator position to the next within said operator area without impairing the exit of the cows following milking.

9. The milking parlor of claim 8 wherein said operator area is circular and said row of stalls extends concentrically around said operator area.

10. The milking parlor of claim 8 wherein said operator area is eye-shaped having opposite arcuate sides, with one said row of stalls arcuately arranged at one arcuate side of the operator area and another said row of stalls arcuately arranged at the opposite side wall.

11. The milking parlor of claim 8, wherein said means for opening and closing the front gate means of said stalls includes indexing means for adjusting the spacing from said rear wall member to said each of said front gate means when the latter are closed so that said spacing can be selected smaller for a shorter cow and larger for a longer cow.

12. The milking parlor of claim 8 wherein said rear wall member includes an arcuate kick rail extending along said operator area at a level partway up the hind legs of the cows.

13. The milking parlor of claim 12 wherein said rear wall member further includes a manure shield disposed at the tail ends of said cows above their hind legs, and a manure trough extending arcuately beneath said manure shields and above the level of said kick rail.

* * * * *